Nov. 13, 1956 — C. E. SCHUTTE — 2,770,161

SEMI-SPHERICAL COMPENSATING WASHER

Filed Sept. 23, 1954

INVENTOR.
CHARLES E. SCHUTTE
BY
Wallace P. Lamb
ATTORNEY.

ced Nov. 13, 1956

2,770,161
SEMI-SPHERICAL COMPENSATING WASHER

Charles E. Schutte, Grosse Pointe, Mich.

Application September 23, 1954, Serial No. 457,859

3 Claims. (Cl. 85—50)

This invention relates generally to fasteners and particularly to washers or spacers for fasteners.

As is well known, there is a great many instances in the manufacture of various products where a fastener shank, such as a stud, bolt or screw must be used to connect together parts which have surfaces for abutment by the bolt head or nut at angles other than right angles to the center thereof such that good bearing surface is not readily had for the bolt head or nut. To rectify this condition, it has been the practice in the past to make washers or nuts that were tapered in thickness. However, these special washers are only good for one given angle of the fastener shank with the result that a great many washers of different taper had to be made and kept in supply which is, of course, expensive and otherwise undesirable.

Accordingly it is an object of my invention to provide a new and improved washer of a character to compensate for practically any angle that a fastener may have with the surface of a part against which the head of the fastener shank is to bear.

Another object is to provide a new and improved washer of the above mentioned character that will decrease the cost materially over angle compensating washers of the past.

Another object is to make a washer of the above mentioned character which carries a locator formed out of the washer as a tab and positioned to prevent the washer from moving down an inclined surface during tightening of the fastener.

A further object resides in providing an inexpensive washer including the said locator, by an arrangement such that the washer can be readily made of sheet material by pressing and forming operations.

Other objects of the invention will become apparent from the following detail description taken in connection with the accompanying drawings in which.

Figure 1:
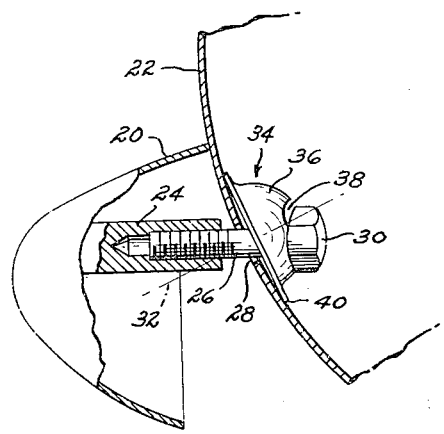
Fig. 1 is a view partly in elevation and partly in section of two parts of a product held together by a fastener in which my new washer is employed.
Figure 2:
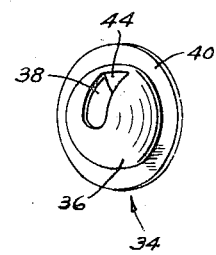
Fig. 2 is a perspective of the washer.

In Fig. 1, the invention is illustrated in connection with the securing together of two parts, 20 and 22 of an assembly which may be any product as the invention has wide utility. In the present illustration, part 20 is hollow and within and rigidly secured to part 20 is one end of a boss 24 which has its other end disposed toward part 22. As shown, boss 24 is internally threaded to receive the threaded shank 26 of a fastener, such as a bolt, which extends through a hole 28 in part 22 and has a head 30.

The hole 28 is of necessity in a rounded or curved wall of part 22 and the longitudinal axis of bolt 26 is of necessity at a considerable angle to the normal indicated by the dot and dash line 32. Consequently, the bolt head 30 will not have suitable bearing contact with part 22 or with an ordinary washer. Further, it will be appreciated that a so-called tapered washer, tapered to compensate for the angularity of the bolt 26 with respect to the normal 32 would otherwise be satisfactory for the one condition making it necessary and therefore expensive to make and keep in stock a great number of washers of different tapers to satisfy all the conditions that may arise.

In order to avoid the expense of making and stocking the above mentioned tapered washers, I provide a unique washer 34 which compensates for any angularity of the bolt 26 to the normal of the surface of a part. To this end, I provide a cup-like washer having a substantially semi-spherical body portion 36 and provide therein a slot-like hole 38 for the bolt 26 whereby the bolt may extend through the hole 38 at any angle within the limits of the ends of the hole 38 and the spheroidal surface of the washer will provide satisfactory bearing surface with the bolt head 30 in any of said positions of the bolt. While I have illustrated the best surface contact between the washer 34 and bolt head 30 by providing the underside of the bolt head with a concave surface to match the spheroidal surface of the washer, it will be understood by those skilled in the art that for many practical purposes, a bolt head having a flat undersurface could be used, particularly with small bolts. Further, the cup-like washer 34 may have a circumferential edge to contact rounded or angularly disposed flat surfaces, or said edge may be provided with an outturned seating flange 40.

Figure 3:
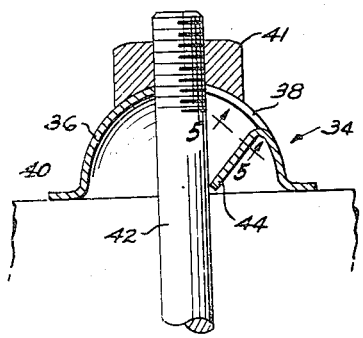
Fig. 3 is an enlarged sectional view showing the washer being used in one extreme position of a bolt.
Figure 4:
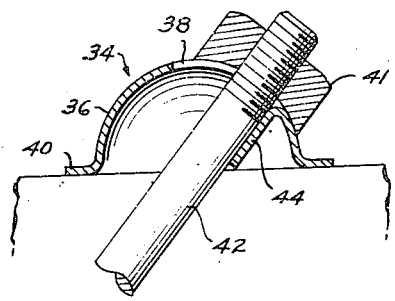
Fig. 4 is a view similar to Fig. 3 showing the washer used in the other extreme position of the bolt.

In order to provide a washer which will compensate for substantially any angularity of a fastener shank to the normal, I arrange slot 38 so that it extends through the crown or high point of the spherical body 36 with respect to seating flange 40 far enough at least to accommodate a stud or bolt located on the normal to flange 40. Referring particularly to Figs. 3 and 4, which show my washer used with a nut 41, it will be seen that in Fig. 3 the bolt, as at 42, is coincident with the normal to flange 40 which is one extreme position, and that Fig. 4 shows the other extreme position of the bolt. It will be seen that the slot 38 provides for substantially all positions that the bolt might assume since the washer can be rotated to the proper or desired position.

Figure 5:
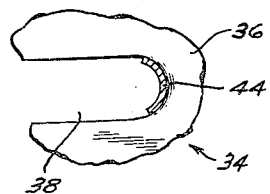
Fig. 5 is a detail sectional view taken along line 5—5 of Fig. 3.

In order to properly locate the washer with respect to the fastener shank 42 so that the washer will not move down off center before or during tightening of the fastener, I provide, a locator or tab 44 which is carried by the washer 34 and engages the bolt 26 or stud 42 in all angular positions thereof. To this end, when making the slot 38 I bend the metal cut-out from the spherical washer body 36 downwardly at the desired or selected angle, as shown in Figs. 3 and 4. The tab 44 is joined or connected to the washer body 36 at the end of the slot 38 that is adjacent the washer seat 40, and the end of the tab 44 terminates within the washer body 36 substantially in the plane of the washer seat. Also the tab 44 is arranged such that it coincides with a plane that intersects the plane of the washer seat outwardly of the center of the washer. Further, the tab 44 is arranged such that its end terminates a distance from the center of the washer substantially equal to the radius of the fastener shank 42. By the above specified arrangement of the washer elements, the washer will compensate for an infinite number of angular positions of fastener shanks within the limits of the ends of the washer slot 38, and the tab 44 will engage the shank and properly locate the washer relative thereto for any of said infinite number of angles. In addition, the tab 44 is formed or bent longitudinally thereof such that the end of the tab is arcuate transversely thereof, as shown in Fig. 5. By this arrangement, the tab end presents two spaced points thereon to engage the fastener shank, the said points being laterally spaced to provide and insure proper engagement of the tab end against the shank.

Figure 6:
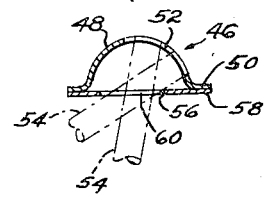
Fig. 6 is a cross sectional view of a modification of my washer.

Referring now to the modified washer 46 of Fig. 6, the washer is similar to washer 34 in having a semispherical body 48 having a seat formed by a circumferential flange 50. A slot 52 is provided in the body 48 extending from the crown thereof down substantially to flange 50 to receive fastener shanks 54 of which two positions are illustrated by dot and dash lines. In order to locate the washer 46 so that it will not slide down an inclined surface when tightening the fastener, I provide a locator or stop 56 which is carried by the washer. To this end, I secure a plate 58 to the underside of washer flange 50 and provide a slot 60 in said plate to receive the fastener shank 54, one end of the slot being the locator or stop 56 located such that it will be engaged by the shank in all angular positions thereof in which the longitudinal axis of the shank 54 is coincident with the center of the spherical washer body 48.

From the foregoing description, it will now be understood that I have provided an improved washer of the character which compensates for the angularity of fasteners such as studs, bolts, screws, etc. with respect to the normal of a surface engaged by the washer. Further it will be appreciated that my washer compensates for substantially all angles that such fasteners may take thus requiring but one kind of washer for substantially all conditions. In addition, it will be understood that my washer carries a locator or tab which prevents the washer from moving laterally away from the fastener shank; that the washer can be inexpensively made as a stamping and that the washer materially decreases cost over previous angle compensating washers.

While I have shown and described my invention in detail, it will be understood that the invention is to be limited only by the spirit and scope of the appended claims.

I claim:

1. A one piece washer for compensating for angles between the head or nut of a fastener shank and a surface of a member through which the shank extends comprising, a thin sheet metal body of generally semi-spherical shape, a seat along the edge of said body to bear against the surface of the member, a tab sheared out of the body providing a slot to receive the shank in any one of an infinite number of positions along the length of the slot depending upon the angle between the head or nut and the surface of the member, said slot extending substantially from the crown of the semi-spherical body arcuately toward said seat, said tab connected to said body at the end of the slot adjacent said seat and bent inwardly of said semi-spherical body to engage the fastener shank and locate the washer relative thereto, said tab having its end terminating substantially in the plane of said seat and spaced from the center of said body a distance substantially equal to the radius of the shank.

2. A washer as set forth in claim 1 characterized by having the tab bent longitudinally thereof forming a transversely arcuate end on the tab to engage the fastener shank.

3. A washer as set forth in claim 1 characterized by having the tab coincident with a line intersecting the plane of the seat outwardly from the center of the semi-spherical body.

References Cited in the file of this patent

UNITED STATES PATENTS

| | | |
|---|---|---|
| 1,424,880 | Colt | Aug. 8, 1922 |
| 1,904,296 | Royse | Apr. 18, 1933 |
| 2,098,997 | Bramming | Nov. 16, 1937 |

FOREIGN PATENTS

| | | |
|---|---|---|
| 15,870 | Great Britain | July 12, 1906 |